Figure 1:
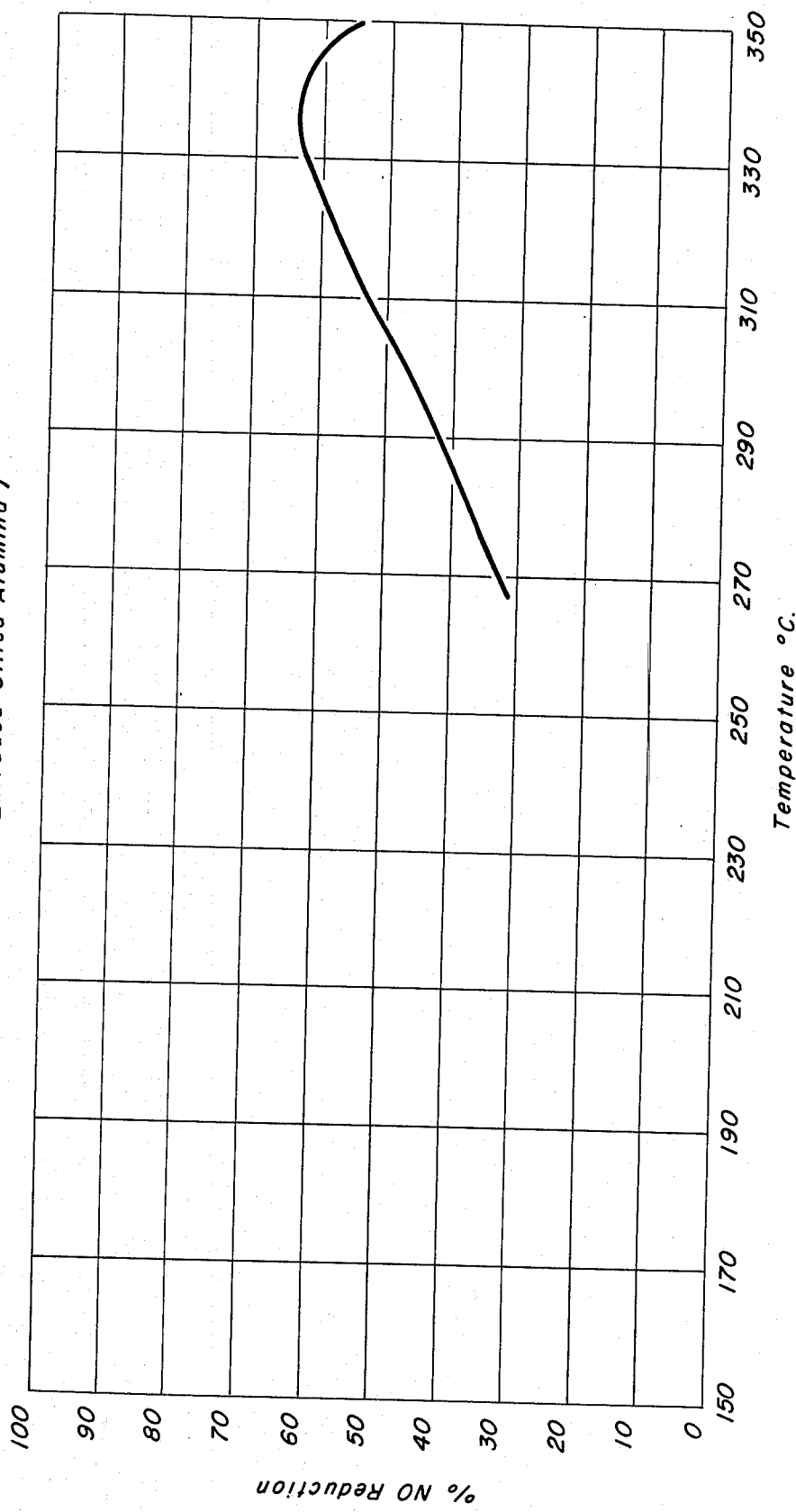

United States Patent [19]

Ginger

[11] 4,268,488
[45] May 19, 1981

[54] PROCESS FOR THE CATALYTIC REDUCTION OF NITROGEN OXIDES IN GASEOUS MIXTURES

[75] Inventor: Edward A. Ginger, Northbrook, Ill.

[73] Assignee: UOP Inc., Des Plaines, Ill.

[21] Appl. No.: 37,615

[22] Filed: May 10, 1979

[51] Int. Cl.³ .............................................. B01D 53/34
[52] U.S. Cl. ................................. 423/239 A; 252/464; 252/465
[58] Field of Search .................. 423/213.2, 213.5, 239, 423/351

[56] References Cited

U.S. PATENT DOCUMENTS

| | | | |
|---|---|---|---|
| 4,070,305 | 1/1978 | Obayashi et al. | 423/239 A X |
| 4,107,272 | 8/1978 | Mori et al. | 423/239 A |
| 4,138,368 | 2/1979 | Kiyomiya et al. | 423/239 X |
| 4,164,546 | 8/1979 | Welty | 423/239 A |

FOREIGN PATENT DOCUMENTS

| | | | |
|---|---|---|---|
| 52-2889 | 1/1977 | Japan | 423/239 |
| 52-135889 | 11/1977 | Japan | 423/239 |

*Primary Examiner*—G. O. Peters
*Attorney, Agent, or Firm*—James R. Hoatson, Jr.; Louis A. Morris; William H. Page, II

[57] ABSTRACT

A process for the reductive removal of a nitrogen oxide from a gaseous stream, particularly a stream containing oxygen, water, sulfur dioxide, nitrogen oxide and nitrogen, by contacting the stream with ammonia in the presence of a mixture of two catalysts. The first catalyst comprises copper or a copper compound, preferably copper sulfate supported on a porous carrier material. The second catalyst is a combination of metals or compounds thereof, preferably sulfates of vanadium and iron or tungsten and iron, also dispersed on a porous carrier material.

11 Claims, 3 Drawing Figures

PROCESS FOR THE CATALYTIC REDUCTION OF NITROGEN OXIDES IN GASEOUS MIXTURES

BACKGROUND OF THE INVENTION

1. Field of the Invention

The field of art to which this invention pertains is the reductive removal of a nitrogen oxide from a gaseous stream. More specifically, this invention relates to such reductive removal characterized by using ammonia as the reducing agent and a mixture of catalysts, each having specific metals or compounds of metals supported thereon.

2. Description of the Prior Art

The effective removal of a nitrogen oxide contained in gaseous streams, particularly waste streams, from various combustion systems has become an important task in view of heightened public awareness of the problems and effects of air pollution. In rising to this task, a wealth of art has recently been published dealing specifically with nitrogen oxide removal. Examples of these publications are: U.S. Pat. Nos. 4,093,561; 4,096,096; 4,117,081; 4,119,568; and 4,119,703.

A common teaching throughout the above publications is that a nitrogen oxide may be reductively removed from a gaseous stream by contacting the stream with a reductant such as ammonia in the presence of a supported metallic catalyst. Following is a tabulation of the above publications and respective catalysts disclosed by each:

| Publication U.S. Pat. No. | Catalyst |
|---|---|
| 4,093,561 | Calcined iron hydroxide coated with alumina. |
| 4,096,096 | Calcined precipitate of a solution of aluminum and iron containing substances. |
| 4,117,081 | Mixture of copper, rhodium, and one of the metals potassium, barium, magnesium, chromium, manganese and molybdenum on alumina. |
| 4,119,568 | Alumina or silica-alumina carrier supporting a compound or mixture of compounds selected from the group consisting of oxides, sulfates and phosphates of a first transition metal of the Periodic Table. |
| 4,119,703 | An oxide or sulfate of iron or copper, or mixtures thereof on a silica-alumina carrier. |

I have discovered an extremely effective process for the reductive removal of nitrogen oxides from a gaseous stream utilizing a specific mixture of catalysts not heretofore known to the art.

SUMMARY OF THE INVENTION

It is accordingly a broad objective of my invention to provide a process for the reductive removal of a nitrogen oxide from a gaseous stream containing said oxide.

In brief summary, my invention is, in one embodiment, a process for the reductive removal of nitrogen oxide from a gaseous stream containing said oxide. The process comprises contacting at a reductive reaction temperature and pressure the gaseous stream and ammonia with a physical mixture of a first catalyst and a second catalyst. The first catalyst comprises copper or a copper compound supported on a porous carrier material and the second catalyst comprises a metal or compound thereof selected from the group consisting of vanadium, chromium, molybdenum and tungsten in combination with a metal or compound thereof, selected from the group consisting of iron, cobalt and nickel, the combination being supported on a porous carrier material.

Other objectives and embodiments of my invention encompass details about gaseous stream mixtures, catalysts and operating conditions, all of which are hereinafter disclosed in the following discussion of each of the facets of the present invention.

DESCRIPTION OF THE INVENTION

Figure 2:
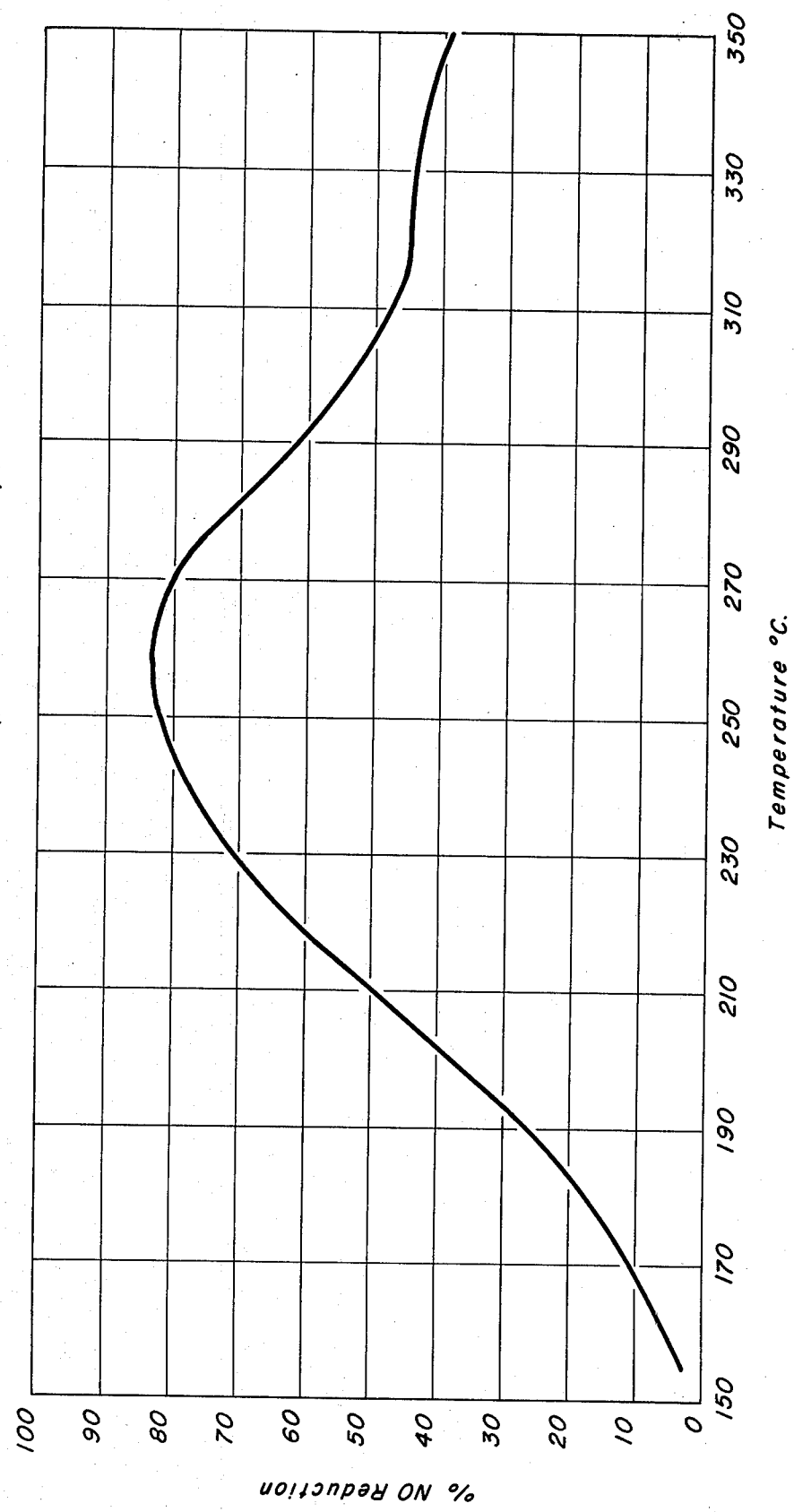
Figure 3:
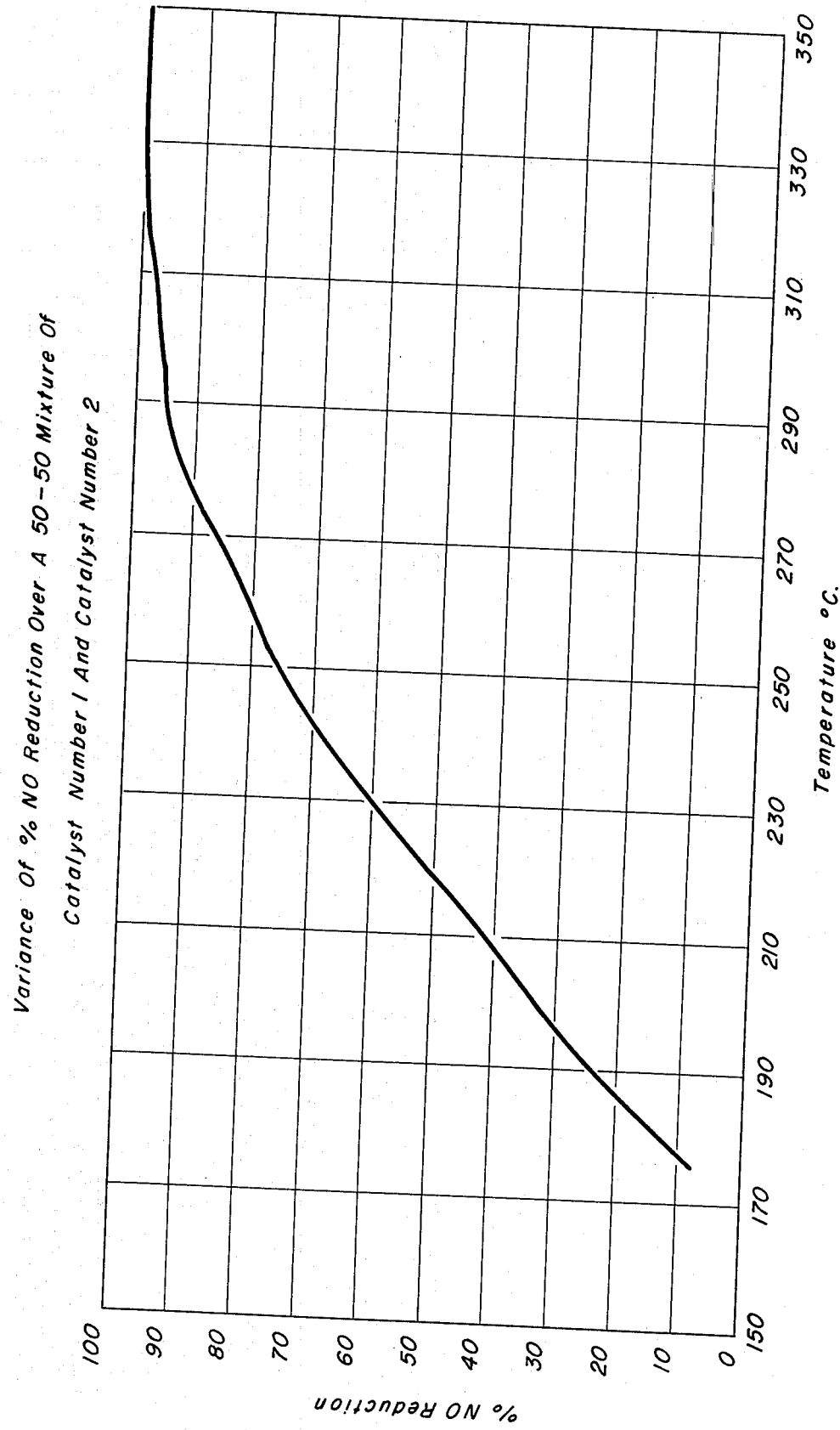

FIGS. 1–3 illustrate a comparison of the catalyst mixture of this invention compared to either component alone.

The basic chemical reactions effected by the process of the present invention are the catalyzed reduction of a nitrogen oxide to free nitrogen with ammonia at reductive reaction temperatures and pressures, and are represented by the following equations:

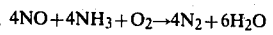

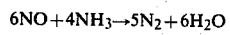

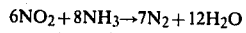

$$4NO + 4NH_3 + O_2 \rightarrow 4N_2 + 6H_2O$$

$$6NO + 4NH_3 \rightarrow 5N_2 + 6H_2O$$

$$6NO_2 + 8NH_3 \rightarrow 7N_2 + 12H_2O$$

I have discovered, in selecting catalyst to be used in this process that a synergistic effect is achieved when a physical mixture of two particular catalysts is employed. One of these catalysts comprises copper or a copper compound on a porous carrier material. The second catalyst comprises a combination of metals, or compounds thereof on a porous carrier material, one such metal selected from the group consisting of vanadium, chromium, molybdenum and tungsten, preferably vanadium or tungsten, and the other such metal from the group consisting of iron, cobalt and nickel, preferably iron. It is particularly preferred that the metals of both catalysts be in the sulfate form.

The above synergistic effect is manifested in the fact that when either of the two catalysts is used alone for the reductive removal of a nitrogen oxide, the extent of the reduction is substantially less than when the mixture of catalysts is employed. This effect may be observed throughout the reduction reaction temperature range and particularly within a preferred range of from about 250° C. to about 400° C. Another aspect of this synergistic effect is that when the catalyst mixture is employed the very high nitrogen oxide reduction is achieved over a wide temperature range unlike the sharp fall-off in nitrogen oxide reduction above and below a specific temperature observed with a single catalyst system.

It is preferred that the porous carrier material used in the catalysts of this invention comprise an inorganic oxide, particularly aluminum oxide or oxides of silica-alumina. It is preferred that the content of the first catalyst be from about 1 to about 15% by weight of the catalyst, calculated on an elemental basis. It is further preferred that the content of each of the metals in the second catalyst be from about 4 to about 10% by weight of the catalyst, calculated on an elemental basis.

The apparent bulk densities of the catalysts of this invention are preferably not substantially different from each other. The term "apparent bulk density" as used herein shall mean, with regard to a given catalyst, the weight of a bed of that catalyst divided by the volume of such bed. It is particularly preferred that the ratio of the apparent bulk density of the first catalyst to that of the second catalyst be from about 0.6:1.0 to about 1.2:1.0. It is also preferred that equal volumes of the first and second supported catalysts be mixed for use in this invention.

The source of the gaseous stream containing the nitrogen oxides, to be reductively removed by the process of this invention, will typically be an industrial flue gas, such as the flue gas from a power generating facility. These flue gases comprise, in varying relative amounts, a mixture of oxygen, water, sulfur dioxide, nitrogen oxides and nitrogen.

Although pressure is not a critical factor in the process of this invention, the preferred pressure of the gaseous stream will be from about atmospheric to about 10 pounds per square inch gauge, which is the expected pressure range for the usual flue gas.

Ammonia is added to and mixed with the gaseous stream prior to contact with the catalyst mixture. It is preferred that the quantity of ammonia added be sufficient to obtain a mole ratio of ammonia to nitrogen oxide of from about 0.75:1.00 to about 1.50:1.00.

The following non-limiting example is given by way of illustration only.

EXAMPLE

For this example, a bench scale apparatus was constructed to simulate an industrial process for the reductive removal of a nitrogen oxide from a flue gas. The catalyst used was packed in a vertical column. The flue gas was passed upwardly through the column thereby effecting contact between the nitrogen oxide and catalyst. The flue gas was heated to a desired initial temperature in a gas preheater immersed in a salt bath with the reactor prior to contact with the catalyst.

A simulated flue gas was prepared which comprised 3% oxygen, 15% water, 2000 ppm sulfur dioxide and 750 ppm nitrogen oxide (NO), with the balance being nitrogen. Ammonia was added to impart 750 ppm ammonia to the flue gas and an ammonia to nitrogen oxide mole ratio of 1:1.

Three test runs were made with the apparatus, each utilizing a different catalyst or mixture of catalysts. For each run 20 cu. ft./hr. of the simulated flue gas and ammonia was passed through the catalyst packed bed at a pressure of about 2 psig. The volume of the packed bed for each run was 50 ml. The performance of the catalyst used during each test run was evaluated in terms of percent NO reduction throughout a specific range of temperatures.

Two catalysts were obtained for use in the test runs. The first catalyst, hereinafter referred to as "Catalyst No. 1", comprised approximately 6% by wt. of copper on extruded silica-alumina support cylinders of 2 mm length and 0.5 mm diameter. The second catalyst, hereinafter referred to as "Catalyst No. 2", comprised 7.5% by wt. of iron and 7.5% by wt. of vanadium on spherical alumina supports (1/16 in. diameter). The apparent bulk density of both catalysts was 0.6 gm/cc. The catalyst bed for each test run was, prior to each such run, treated in situ with $SO_2$ in a nitrogen stream containing 2000 ppm $SO_2$, so as to convert the metals comprising the catalysts to the sulfate form.

Only Catalyst No. 1 was used for the first test run. The results of this test run are set forth in FIG. 1 on the form of a correlation between percent NO reduction vs. temperature. It can be seen from FIG. 1 that the maximum NO reduction that could be achieved, using only Catalyst No. 1, was about 62% at 340° C.

Only Catalyst No. 2 was used for the second test run. The results of this test run are set forth in FIG. 2. It can be seen from FIG. 2 that the maximum NO reduction that could be achieved, using only Catalyst No. 2, was about 80% at 270° C. There was a sharp fall-off of NO reduction at temperatures below and above 270° C.

For the third test run a mixture of equal volumes (25 ml each) of Catalyst No. 1 and Catalyst No. 2 was utilized. The results of this test run are as set forth on FIG. 3. FIG. 3 shows that the use of a mixture of catalysts enabled an NO reduction of 100% at 300° C. with no indication of fall-off at higher temperatures. At temperatures higher than the temperature scale of FIG. 3, during the third test run, fall-off was observed beginning at about 367° C. above which temperature NO reduction slowly diminished to 88% at 400° C. However, subsequent test runs made with the same two catalyst mixtures showed no fall-off even up to 400° C.

Thus, far better results were achieved with the mixture of Catalyst No. 1 and Catalyst No. 2 than could be realized by the use of either catalyst alone and the synergistic effect of the present invention was amply illustrated.

I claim as my invention:

1. A process for the reductive removal of a nitrogen oxide from a gaseous stream containing said oxide which comprises contacting, at a reductive reaction temperature and pressure, said stream and ammonia with a physical mixture of a first catalyst and a second catalyst, said first catalyst comprising on an elemental basis from about 1 to about 15 wt % copper or a copper compound supported on a first porous carrier material, and said second catalyst comprising on an elemental basis from about 4 to about 10 wt % of a first component selected from the group consisting of vanadium, chromium, molybdenum and tungsten, and compounds thereof, in combination with on an elemental basis from about 4 to about 10 wt % of a second component selected from the group consisting of iron, cobalt and nickel, and compounds thereof, said combination being supported on a second porous carrier material.

2. The process of claim 1 further characterized in that said gaseous stream comprises a mixture of oxygen, water, sulfur dioxide, a nitrogen oxide and nitrogen.

3. The process of claim 1 further characterized in that said first catalyst comprises on an elemental basis from about 1 to about 15 wt % copper sulfate supported on said first porous carrier material.

4. The process of claim 1 further characterized in that said first component comprises on an elemental basis from about 4 to about 10 wt % vanadium sulfate or tungsten sulfate and said second component comprises on an elemental basis from about 4 to about 10 wt % iron sulfate.

5. The process of claim 1 further characterized in that the ratio of the apparent bulk density of said first catalyst to the apparent bulk density of said second catalyst is from about 0.6 to about 1.2.

6. The process of claim 5 further characterized in that equal volumes of said first catalyst and said second catalyst are utilized.

7. The process of claim 1 further characterized in that said porous carrier material comprises an inorganic oxide.

8. The process of claim 7 further characterized in that said inorganic oxide comprises aluminum oxide.

9. The process of claim 1 further characterized in that said reductive reaction temperature is within a range from about 250° C. to about 400° C. and a pressure within a range from about atmospheric to about 2 psig.

10. The process of claim 1 further characterized in that said reductive reaction pressure is within a range from about atmospheric pressure to about 10 pounds per square inch gauge.

11. The process of claim 1 further characterized in that said ammonia is present in an amount sufficient to result in a mole ratio of said ammonia to said nitrogen oxide from about 0.75 to about 1.50.

* * * * *